United States Patent
Kwon et al.

(10) Patent No.: US 12,167,312 B2
(45) Date of Patent: Dec. 10, 2024

(54) ELECTRONIC DEVICE AND OPERATING METHOD

(71) Applicant: SAMSUNG ELECTRONICS CO., LTD., Suwon-si (KR)

(72) Inventors: Heungkyu Kwon, Seongnam-si (KR); Yongchul Choi, Hwaseong-si (KR); Jungcheon Choi, Seoul (KR)

(73) Assignee: Samsung Electronics Co., Ltd. (KR)

(*) Notice: Subject to any disclaimer, the term of this patent is extended or adjusted under 35 U.S.C. 154(b) by 229 days.

(21) Appl. No.: 17/675,307

(22) Filed: Feb. 18, 2022

(65) Prior Publication Data
US 2022/0272514 A1    Aug. 25, 2022

(30) Foreign Application Priority Data

Feb. 19, 2021 (KR) .................. 10 2021 0022695
Jun. 14, 2021 (KR) .................. 10 2021 0076995

(51) Int. Cl.
*H04W 4/90* (2018.01)
*H04W 4/40* (2018.01)

(52) U.S. Cl.
CPC .............. *H04W 4/90* (2018.02); *H04W 4/40* (2018.02)

(58) Field of Classification Search
CPC ................................. H04W 4/40; H04W 4/90
USPC ..................................................... 455/404.1
See application file for complete search history.

(56) References Cited

U.S. PATENT DOCUMENTS

| | | | |
|---|---|---|---|
| 7,865,282 B2 | 1/2011 | Murlidar et al. | |
| 8,417,212 B2 | 4/2013 | Cepuran et al. | |
| 8,971,838 B2 | 3/2015 | Dietz | |
| 9,524,034 B2 | 12/2016 | Naboulsi | |
| 10,197,457 B2 * | 2/2019 | Jang | G06F 1/206 |
| 10,509,407 B2 | 12/2019 | Absmeier et al. | |
| 10,532,709 B2 | 1/2020 | Naboulsi | |
| 11,493,967 B2 * | 11/2022 | Vishnubhatla | G06F 9/442 |
| 2005/0101287 A1 * | 5/2005 | Jin | H04M 1/677 |
| | | | 455/343.1 |
| 2005/0288051 A1 * | 12/2005 | Van Bosch | H04M 1/72418 |
| | | | 455/404.1 |
| 2010/0328081 A1 * | 12/2010 | Hu | H04B 1/3883 |
| | | | 340/586 |
| 2018/0099678 A1 | 4/2018 | Absmeier et al. | |
| 2020/0037227 A1 | 1/2020 | Breaux, III et al. | |
| 2020/0090421 A1 | 3/2020 | Narita | |
| 2020/0162879 A1 | 5/2020 | Lotfallah et al. | |
| 2022/0060957 A1 * | 2/2022 | Shuman | G06F 1/3278 |

* cited by examiner

*Primary Examiner* — Maria El-Zoobi
(74) *Attorney, Agent, or Firm* — Fish & Richardson P.C.

(57) ABSTRACT

An electronic device mounted in a vehicle and including; a temperature sensor configured to measure a temperature associated with a measurement target to generate a measured temperature, and a controller configured to operate in a normal operating mode if the measured temperature is less than a first reference temperature, and further configured to operate in a limited control mode if the measured temperature is greater than or equal to the first reference temperature. During the normal operating mode, the controller is enabled to perform a performance limiting function, and during the limited control mode, the controller is enabled to perform an emergency call (eCall) function and is disabled to perform a performance limiting function.

20 Claims, 11 Drawing Sheets

| Environment | Meaning of the environment, AP and Modem, TCU status perspective | Hrs | Tjmax°C based mission profile |
|---|---|---|---|
| Drive | Driving | H1 | T1°C/p1%, T2°C/p2%, T3°C/p3%, T4°C/p4% |
| Idle @Drive | Standing by for signal and parking | H2 | T5°C/p5%, T6°C/p6%, T7°C/p7%, T8°C/p8% |
| Deep Sleep | Standing by for update of SW | H3 | T9°C/100% |
| Power Off | Power Off | H4 | T10°C/100% |

ELECTRONIC DEVICE AND OPERATING METHOD

CROSS-REFERENCE TO RELATED APPLICATIONS

This application claims priority under 35 U.S.C. § 119 to Korean Patent Application No. 10-2021-0022695 filed on Feb. 19, 2021 and Korean Patent Application No. 10-2021-0076995 filed on Jun. 14, 2021, the collective subject matter of which is hereby incorporated by reference in its entirety.

BACKGROUND

The inventive concept relates generally to electronic devices. More particularly, the inventive concept relates to electronic devices capable of distinguishably operating in an emergency call (eCall) scenario, as opposed to telematics scenario(s) (e.g., one or more operating scenarios other than the eCall scenario). The inventive concept also relates to electronic devices capable of performing a lifespan guarantee test in relation to an operating environment associated with various distinguishable operating scenarios.

In conjunction with the general development of information and communication technologies, various studies have been performed related to telematics (telecommunications and informatics) as applied to vehicle-based platforms. For example, certain telematics studies assess the provision of various information services to the driver and/or passengers of a vehicle. Examples of relevant information services include traffic information, traffic guides, emergency rescue information, as well as other Internet-based information and/or communication services. In this regard, the information and/or communication services may be informed by vehicle location information, wireless communication network(s), etc.

To many consumers, as well as safety regulatory agencies, the eCall function is an important vehicle-based capability. Although subject to various implementations, the eCall function essentially enables a driver-actuated request and/or an automatically-activated request for emergency services (hereafter, an "assistance request"). Here, assistance request(s) may communicate information such as accident location, seriousness assessment, damage information. etc. to an emergency rescue agency upon the occurrence of a vehicle-related accident. In some jurisdictions, the eCall function has been mandated as a compulsory function of the vehicle.

Under such conditions, it is necessary to ensure the proper operation of the eCall function under a range of environmental conditions (e.g., extreme temperatures). For example, a defined maximum operating temperature for the eCall function may exceed the maximum operating temperature for other vehicle functions. Additionally, certain lifespan guarantee conditions associated with the eCall function should be tested over a sufficiently long period of time.

SUMMARY

Embodiments of the inventive concept provide an apparatus for performing a temperature control by distinguishing an operation that requires a long-time operation and an emergency call (eCall) that requires a stable operation even in a short-time extreme environment, and supporting lifespan guarantee considering distinguished characteristics.

According to an aspect of the inventive concept, there is provided an electronic device mounted in a vehicle, the electronic device including; a temperature sensor configured to measure a temperature associated with a measurement target to generate a measured temperature, and a controller configured to operate in a normal operating mode if the measured temperature is less than a first reference temperature, and further configured to operate in a limited control mode if the measured temperature is greater than or equal to the first reference temperature, wherein during the normal operating mode, the controller is enabled to perform a performance limiting function, and during the limited control mode, the controller is enabled to perform an emergency call (eCall) function and is disabled to perform a performance limiting function.

According to an aspect of the inventive concept, there is provided an operating method for an electronic device supporting a vehicle telematics function. The operating method includes; determining whether the electronic device is operating in an emergency control mode, upon determining that the electronic device is operating in the emergency control mode, performing an emergency call (eCall) function during a defined period, wherein during the emergency control mode the electronic device is disabled from performing a performance limiting function; else, upon determining that the electronic device is not operating in the emergency control mode, operating in a normal mode, wherein during the normal mode the electronic device is enabled to perform the performance limiting function.

According to an aspect of the inventive concept, there is provided a lifespan testing method for an electronic device supporting a vehicle telematics function, wherein the electronic device is configured to operate in a limited control mode during a normal mode to perform a performance limiting function when a temperature of an integrated circuit associated with the electronic device is greater than or equal to a reference temperature, and further configured to operate in an emergency control mode in which the performance limiting function is disabled and an emergency call (eCall) function is enabled. The testing method includes; performing a lifespan guarantee test by applying first test conditions associated with the emergency control mode, and applying second test conditions associated with the normal mode, wherein the first test conditions include a first temperature and a first test time, and the second test conditions include a second temperature greater than the first temperature and a second test time less than the first test time.

BRIEF DESCRIPTION OF THE DRAWINGS

Embodiments of the inventive concept will be more clearly understood from the following detailed description taken in conjunction with the accompanying drawings in which.

DETAILED DESCRIPTION

Hereinafter, embodiments of the inventive concept will be described in some additional detail with reference to accompanying drawings. Throughout the written description and drawings, like reference numbers and labels are used to denote like or similar elements, components and/or method steps.

Figure 1:
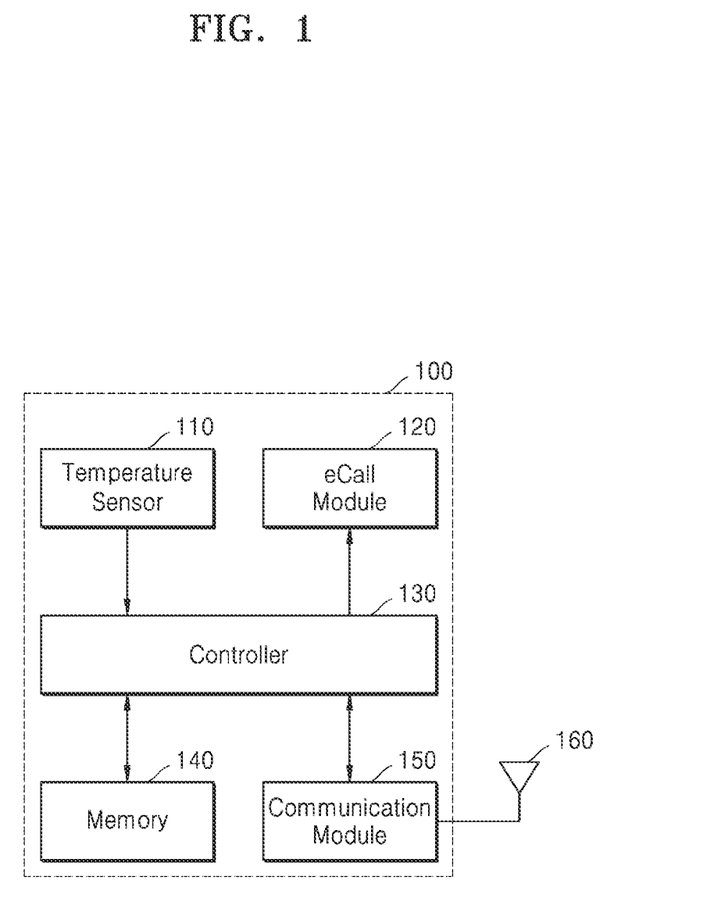
FIG. 1 is a block diagram illustrating an electronic device according to embodiments of the inventive concept.

Figure (FIG. 1 is a block diagram illustrating an electronic device 100 according to embodiments of the inventive concept.

The electronic device 100 may be variously implemented within the electronic equipment of a vehicle and may be configured to perform one or more telematics function(s). For example, the electronic device 100 may include electronic equipment such as a digital still camera, a digital video camera, a smart phone, a wearable device, an Internet of Things (IoT) device, a tablet personal computer (PC), a personal digital assistant (PDA), a portable multimedia player (PMP), a navigation device, etc. Alternately or additionally, the electronic device 100 may include electronic equipment provided as a component within a vehicle, as well as furniture, manufacturing equipment, a door, various measuring devices, etc.

Referring to FIG. 1, the electronic device 100 may include a temperature sensor 110, an emergency call (eCall) module 120, a controller 130, a memory 140, a communication module 150, and an antenna 160.

The temperature sensor 110 may measure temperature associated with the electronic device 100, a portion of the electronic device 100 or a constituent component of the electronic device 100 (hereafter generically, the "measurement target"). The temperature sensor 110 may communicate (e.g., transmit and/or receive) various measured data (hereafter generically, "temperature data") with the electronic device 100. Here, the temperature sensor 110 may operating within electronic device 100 and/or external to the electronic device 100. For example, the temperature sensor 110 may communicate periodically measured temperature data to the electronic device 100 or controller 130. In this regard, the temperature sensor 110 monitors at least one temperature associated with the electronic device 100 and generates an event signal if the temperature exceed a reference temperature. The event signal may be variously defined and may be communicated to the electronic device 100 or controller 130.

The eCall module 120 may be used to determine the relative seriousness (e.g., impact acceleration) of a traffic accident and automatically perform vehicle accident notification in relation to the seriousness of the traffic accident. That is, a vehicle accident notification (which may take the form of an assistance request) may be generated using various sensing devices, such as acceleration sensors, velocity sensors, a global positioning system (GPS) device, a control area network (CAN) controller, etc.

In this manner, the eCall module 120 may determine occurrence of a vehicle accident and the seriousness of the vehicle accident, and then automatically generate and communicate a vehicle accident notification based on various information (e.g., optical image information, speed information, impact information, vehicle location information, CAN-related information etc.). In some embodiments, the eCall module 120 may determine a specific type for the accident, such as vehicular, pedestrian, bicycle, etc. This accident type determination may then be used to determine the overall seriousness of the accident.

The controller 130 may be electrically connected to the temperature sensor 110, the eCall module 120, the memory 140, and the communication module 150, may electrically control each of these components. In this regard, the controller 130 may be variously implemented as an electrical circuit executing software commands to perform various data processing and calculations.

The controller 130 may perform a temperature control (e.g., throttling or rebooting), based on temperature data associated with the electronic device 100, the controller 130, and/or some other hardware component connected to the electronic device 100.

The memory 140 may be used to store various data used by at least one of the controller 130, the eCall module 120, the communication module 150 and the temperature sensor 110. The data may include, for example, programming software, input data, intermediate computational data, and/or output data.

The memory 140 may include at least one type of storage medium from among a flash memory type memory, a hard disk type memory, a micro type memory, and a card type memory (e.g., a secure digital (SD) card or an extreme digital (XD) card), random access memory (RAM), static RAM (SRAM), read-only memory (ROM), programmable ROM (PROM), electrically erasable PROM (EEPROM), magnetic RAM (MRAM), a magnetic disk, an optical disk type memory, etc.).

The communication module 150 may be used to establish a communication channel (e.g., a hardwired channel and/or a wireless channel) between the electronic device 100 and an external device. In this regard, the communication module 150 may support communication via an established communication channel. The communication module 150 may operate independently from the controller 130 (e.g., an application processor), and may include one or more communication processors supporting direct (e.g., wired) communication or wireless communication. In some embodiments, the communication module 150 may include a wireless communication module (e.g., a cellular communication module, a short-range wireless communication module, or a global navigation satellite system (GNSS) communication module) and/or a hardwired communication module (e.g., a local area network (LAN) communication module or a power line communication module).

For example, the communication module 150 may include (or correspond to) a Bluetooth, Wi-Fi direct, an infrared data association (IrDA), a long-range communication network, such as a cellular network, the Internet, or a computer network (e.g., LAN or wide area network (WAN)). Such various types of communication modules may be integrated into one component (e.g., a single chip) or implemented as separate components (e.g., multiple semiconductor chips). The wireless communication module may identify and authenticate the electronic device 100 in a communication network, such as the first network or the second network, by using subscriber information (e.g., international mobile subscriber identity (IMSI)) stored in a subscriber identification module.

The antenna 160 may communicate a signal or power with one or more external devices. In some embodiments, the antenna 160 may include an antenna including an emitter consisting of a conductor or conductive pattern formed on a substrate (e.g., a printed circuit board (PCB)). According to an embodiment, the antenna 160 may include a plurality of antennas. In this case, at least one antenna suitable to a communication method used in the communication network, such as the first network or the second network, may be selected from the plurality of antennas by, for example, the communication module 150. The signal may be communicated between the communication module 150 and the external device via the at least one selected antenna. In some embodiments, a component (e.g., a radio frequency integrated circuit (RFIC)) other than the emitter may be additionally formed as a part of the antenna 160.

At least two of the foregoing components may be interconnected using one or more communication protocols and/or interconnection approaches, such as those routinely used to connect peripheral devices (e.g., one or more bus(es), a general-purpose input and output (GPIO), a serial peripheral interface (SPI), a mobile industry processor interface (MIPI), etc.).

Figure 2:
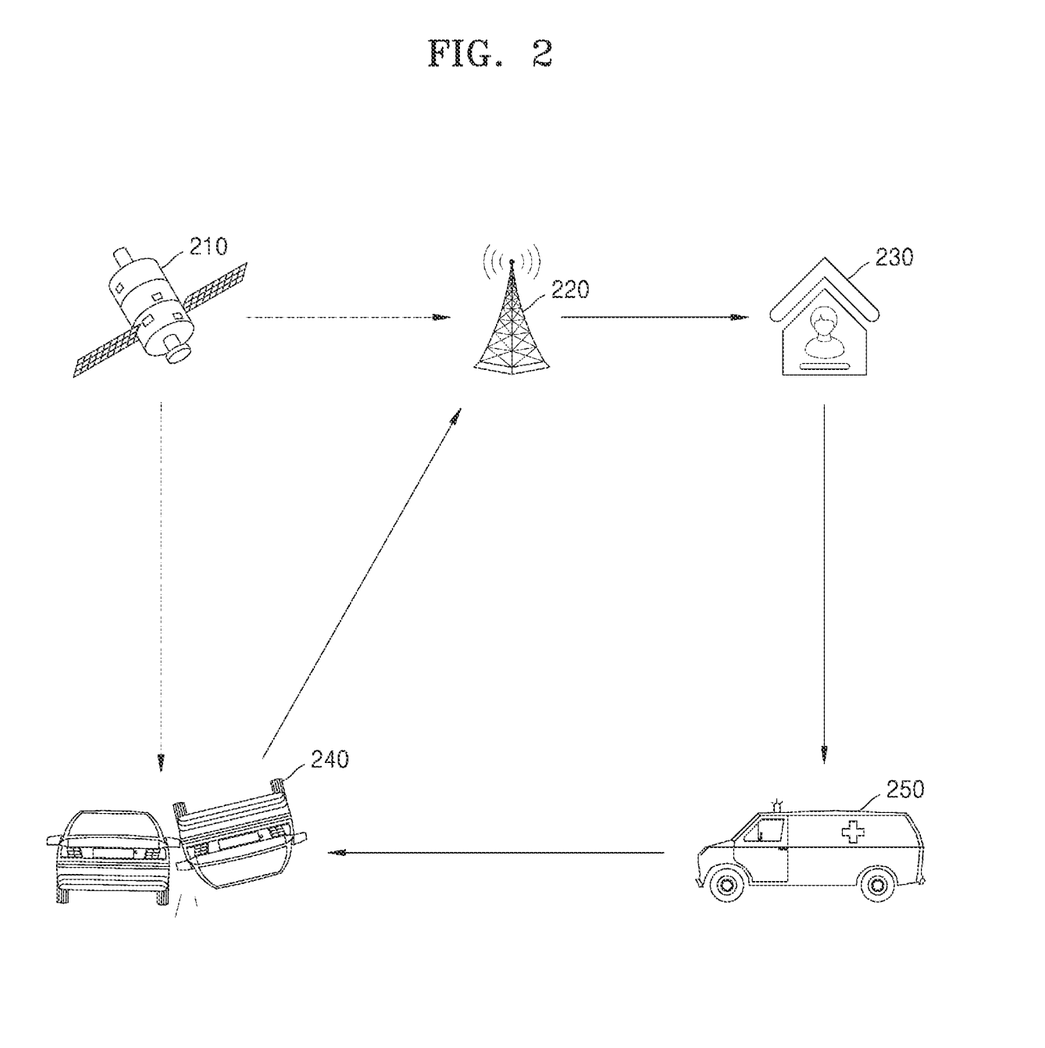
FIG. 2 is a conceptual diagram illustrating the performance of an emergency call (eCall) according to embodiments of the inventive concept.

FIG. 2 is a conceptual diagram illustrating the use or performance of eCall according to embodiments of the inventive concept.

Here, it is assumed for purposes of illustration that telematics supports control of a smart home feature such as control of a home-based device or control of a vehicle using a smart terminal accessible to a driver. That is, telematics support may use a communication module and a control module mounted in a vehicle. In this regard, telematics may support a vehicle remote control and state management via communication with an Internet server or the like, and provide Internet-based information including multimedia information to the driver and/or passenger in the vehicle.

In addition to general communication functions, telematics may support an eCall function capable of generating and communicating (manually or automatically) an assistance request including an accident location and accident-related information to an emergency rescue agency as the result of a vehicle-related accident.

As conceptually illustrated in FIG. 2, the eCall may be precipitated upon occurrence of an accident related to a vehicle 240 mounting an eCall system and enabling a competent eCall function. Here, it is further assumed that the eCall system is able to detect occurrence of the accident and communicate with a vehicle eCall management system server 230 via a base station 220. eCall information indicating occurrence of the accident and requesting emergency rescue may be communicated via a communication module mounted in the vehicle 240.

Thus, the vehicle 240 may receive location information associated with the vehicle 240 from a GPS satellite 210, and may accordingly, communicate vehicle location information to the vehicle eCall management system server 230.

The vehicle eCall management system server 230 may then forward the assistance request to an eCall processing department 250 controlling the dispatch of an accident response team to a location of the vehicle 240.

In some embodiments, the vehicle 240 mounting the eCall system may directly communicate the eCall (i.e., the assistance request) to an emergency rescue agency in response to a very serious accident, such as a high-speed collision or rollover. In this regard, eCall information may include various data indicating or identifying accident location, vehicle type, accident type, driving direction, whether the accident was reported automatically or manually, fuel type, whether seat belt(s) were worn, etc. All or some of this eCall information may be automatically communicated to the emergency rescue team responding to the accident.

In some embodiments, telematics uses a multi-input multi-output (MIMO) antenna including at least one main antenna and at least one auxiliary antenna, so as to improve performance of data communication. The eCall system may also be configured to perform the eCall by selecting one of the available main antenna(s) or auxiliary antenna(s) depending on a vehicle condition, such that the eCall function is executed using best available resources following the vehicle accident, particularly when the accident is deem very serious (e.g., a vehicle rollover).

Because a frequency domain used by the telematics and a frequency domain used during the eCall may be different, an antenna for the telematics and the antenna selected by the eCall system may be different.

The eCall system mounted in the vehicle must be able to execute (or perform) an eCall function across a range of environmental conditions including low temperatures and high temperatures. For example, in some embodiments, the eCall function must be capable of reliable performance over a defined "minimal period of time" at temperatures of up to about 95° C.

Figure 3:
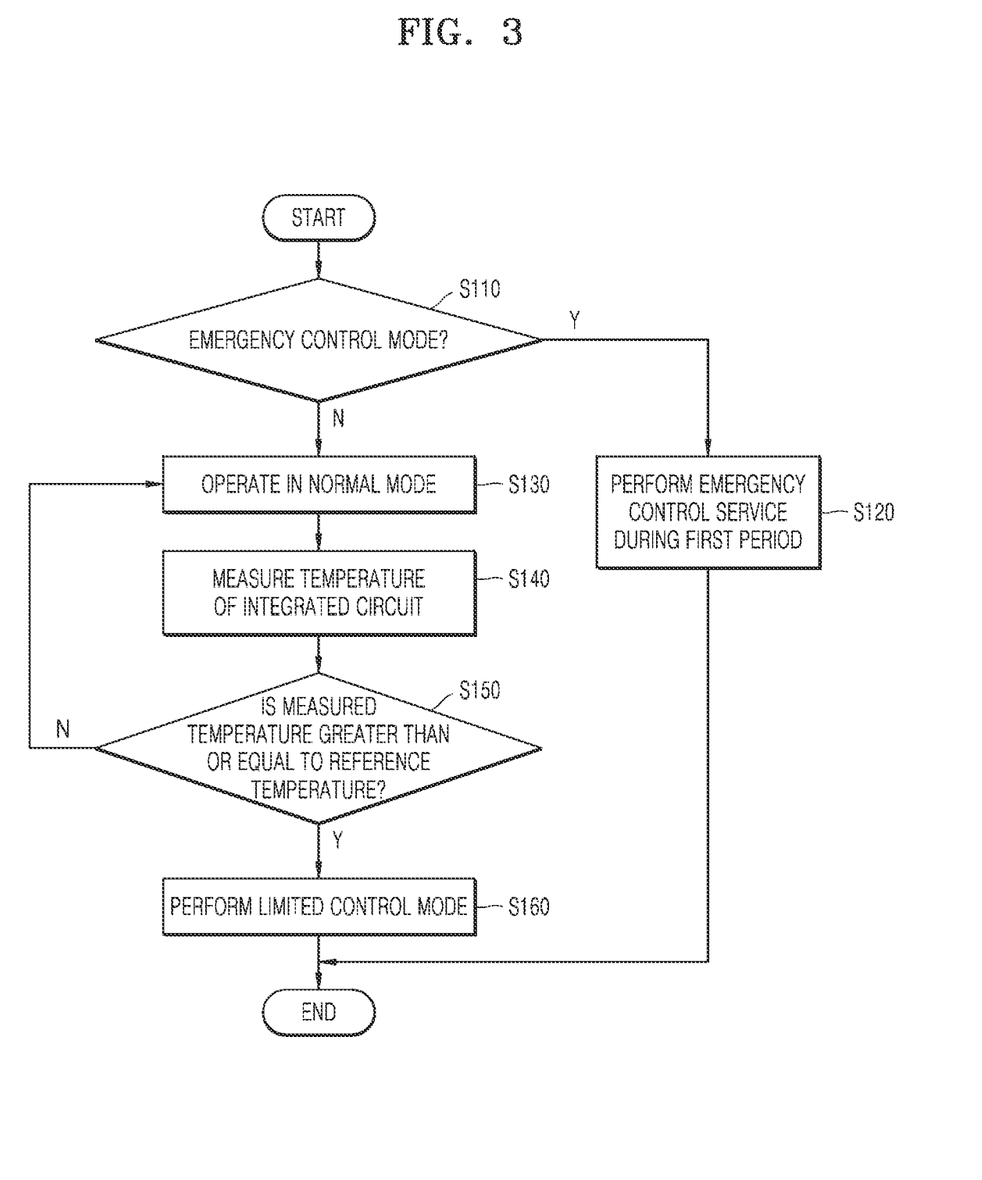
FIG. 3 is a flowchart illustrating an emergency control mode operation for an electronic device according to embodiments of the inventive concept.

FIG. 3 is a flowchart illustrating an emergency control mode for an electronic device according to embodiments of the inventive concept.

Here, the electronic device may operate in the emergency control mode when an eCall function is executed. Various operations performed during the emergency control mode may be assigned a higher priority than operations performed during other (e.g., normal) modes of operation associated with the electronic device.

In the illustrated method of FIG. 3, the electronic device may determine whether a current operating mode is the emergency control mode (S110). If the current mode is the emergency control mode (S110=Yes), the electronic device may perform the eCall function during a first period (S120). For example, during the emergency control mode, the electronic device may perform the eCall function for a defined first period of time without performing any function (or operating in any other mode) that inherently limits performance of the electronic device (hereafter generally, a "performance limiting function"). Examples of a performance limiting function include a power (or performance) throttling operation or a reboot procedure. Further, this mandate that no performance limiting function may be performed during the emergency control mode extends to conditions that would otherwise initiate exactly such performance limiting functions, such as receipt of temperature data indicating that an integrated circuit (or some other part) of the electronic device exceeds a pre-set temperature threshold.

Thus, referring to FIGS. 1 and 3, the controller 130 may be configured to operate in a normal operating mode so long as a measured temperature provided by the temperature sensor 110 is less than a first reference temperature, and may be further configured to operate in a limited control mode if the measured temperature is greater than or equal to the first reference temperature. Here, during the normal operating mode, the controller is enabled to perform a performance limiting function, but during the limited control mode, the controller is enabled to perform an eCall function and disabled to perform a performance limiting function.

Accordingly, the electronic device will finish execution of the eCall function when another request data communication—other than the eCall—is received during the emergency control mode. In this regard, the electronic device may limit the duration of the emergency control mode to the first period (e.g., a maximum time period), or a number of iterations for the eCall function. For example, during the emergency control mode, the electronic device may store an execution time or a number of performances for the emergency control mode to facilitate monitoring. The electronic device may than store the monitored execution time or number of performances in non-volatile memory, such as a one-time password (OTP) or Nor/Nand flash memory embedded in a modem and manage same.

However, if the current mode for the electronic device is not the emergency control mode (S110=No), the electronic device may operate in normal mode (S130). During the normal mode of operation, the electronic device may periodically measure temperatures associated with the electronic device (e.g., the temperature of an integrated circuit) (S140), and monitor the measured temperature or control operations of the electronic device in relation to the measured temperature. Referring to FIGS. 1 and 3, for example, the electronic device 100 may monitor the temperature of the controller 130, the communication module 150, or some other component of the electronic device in relation to temperature data provided by the temperature sensor 110.

Accordingly, the electronic device may determine whether the measured temperature is greater than or equal to a reference temperature (S150). If the measured temperature rises to at least the reference temperature (S150=Yes), the electronic device may operate in a limited control mode (S160) to execute one or more performance limiting function(s). That is, during the limited control mode, the electronic device may limit performance of one or more components of the electronic device, or perform corrective procedures such as rebooting. In this regard, the electronic device may reduce the level of a voltage and/or current (hereafter singularly or collectively, "voltage/current") applied to one or more component(s) of the electronic device (e.g., reducing a power voltage/current supplied to a processor, or reducing the operating frequency of the processor, etc.).

Alternately, so long as the measured temperature remains less than the reference temperature (S150=No), the electronic device may maintain to operate in the normal mode.

Figure 4:
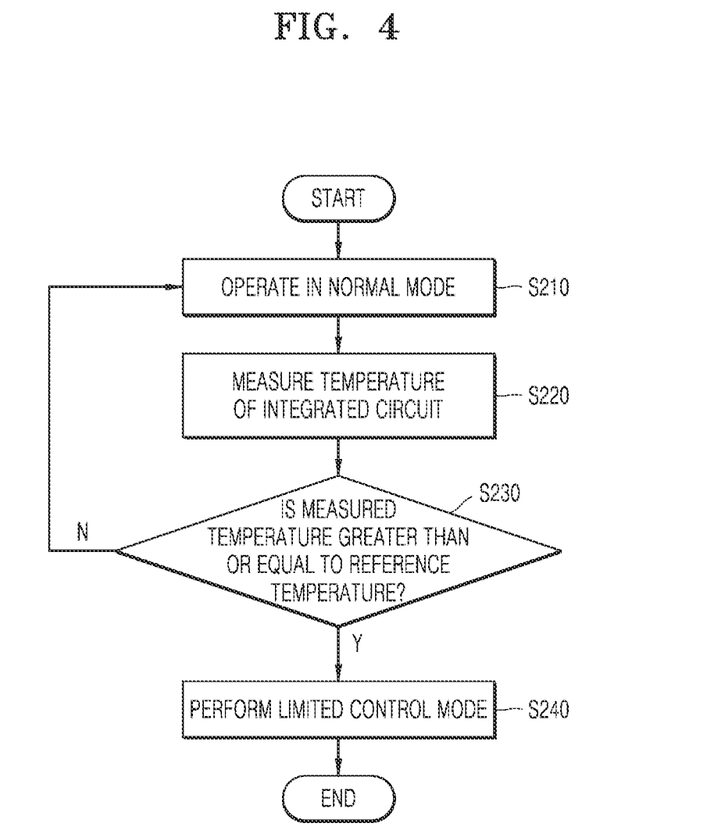
FIG. 4 is a flowchart illustrating a high temperature limited control mode operation for an electronic device according to embodiments of the inventive concept.

FIG. 4 is a flowchart illustrating a high temperature limited control mode for an electronic device according to embodiments of the inventive concept.

The electronic device may operate in a normal mode for performing a telematics function (S210). For example, the telematics function combined with wireless communication and GPS technology may include various mobile communication services, such as location information of a vehicle, safe driving, entertainment, financial service, reservation, and purchase.

The electronic device may periodically measure a temperature associated with the electronic device (S220), and monitor the measured temperature or control operations of the integrated circuit in relation to the measured temperature. Referring to FIGS. 1 and 3, for example, the electronic device 100 may monitor the temperature of the controller 130, the communication module 150, or some other component of the electronic device in relation to temperature data provided by the temperature sensor 110.

The electronic device may determine whether the measured temperature is greater than or equal to a reference temperature (S230). If the measured temperature is greater than or equal to the reference temperature (S230=Yes), the electronic device may operate in the limited control mode (S240) as described above, otherwise if the measured temperature is not greater than or equal to the reference temperature (S230=No), the electronic device may operate in the normal mode (S210).

In regard to the foregoing in certain embodiments, the reference temperature may be defined in relation to a guaranteed maximum operating temperature for the electronic device or a component within the electronic device.

Figure 5:
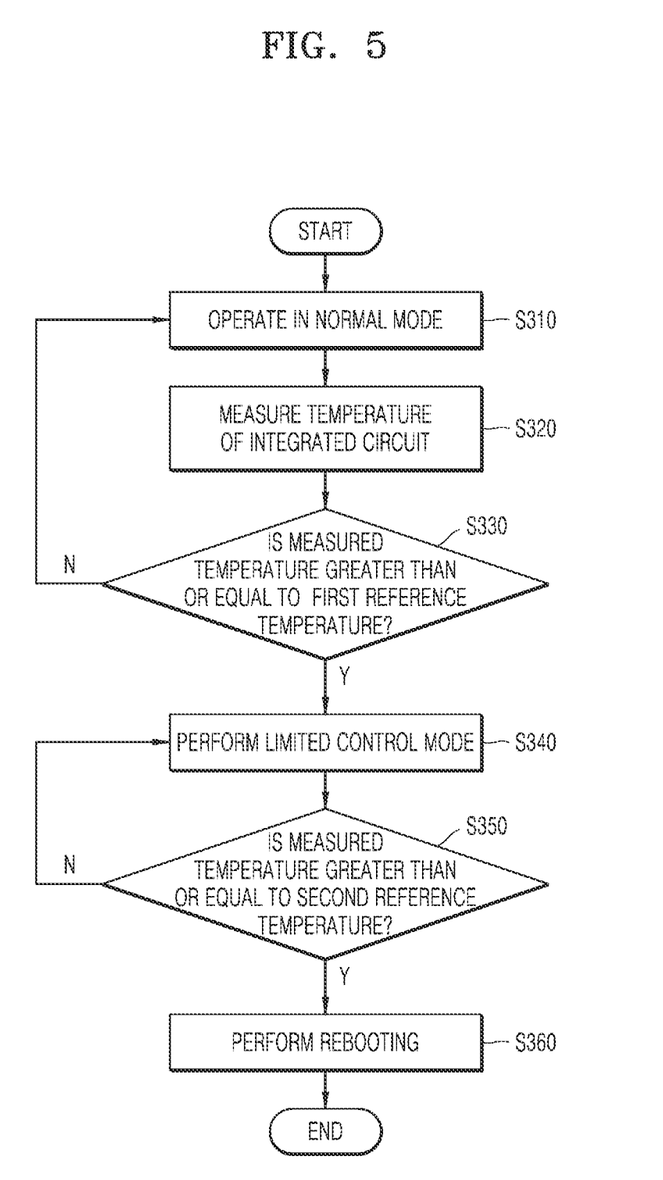
FIG. 5 is a flowchart illustrating a high temperature limited control mode operation for an electronic device according to embodiments of the inventive concept.

FIG. 5 is a flowchart illustrating a high temperature limited control mode for an electronic device according to embodiments of the inventive concept.

The electronic device may operate in a normal mode that includes performing a telematics function (S310). The electronic device may periodically measure a temperature of an integrated circuit included in the electronic device (S320), and monitor the measured temperature or control operations of the integrated circuit in relation to the measured temperature. Alternately or additionally, the electronic device may monitor a temperature associated with a controller, a communication module, or some other component within the electronic device using temperature data provided by one or more temperature sensor(s).

The electronic device may determine whether the measured temperature is greater than or equal to a first reference temperature (S330). If the measured temperature equals or exceeds the first reference temperature, the electronic device may operate in (or perform) a limited control mode (S340). Consistent with the foregoing, while operating in the limited control mode the electronic device will not execute any performance limiting functions or procedures.

Once operating in the limited control mode, the electronic device may determine whether the measured temperature is greater than or equal to a second reference temperature (S350). If the measured temperature is greater than or equal to the second reference temperature, the electronic device may perform a rebooting procedure in relation to (e.g.) a processor included in the electronic device (S360).

In this regard, the normal mode may be understood as a first operating mode in which a telematics function is performed, whereas an emergency control mode may be understood as a second operating mode in which an eCall function (or service) may be performed.

Figure 6:
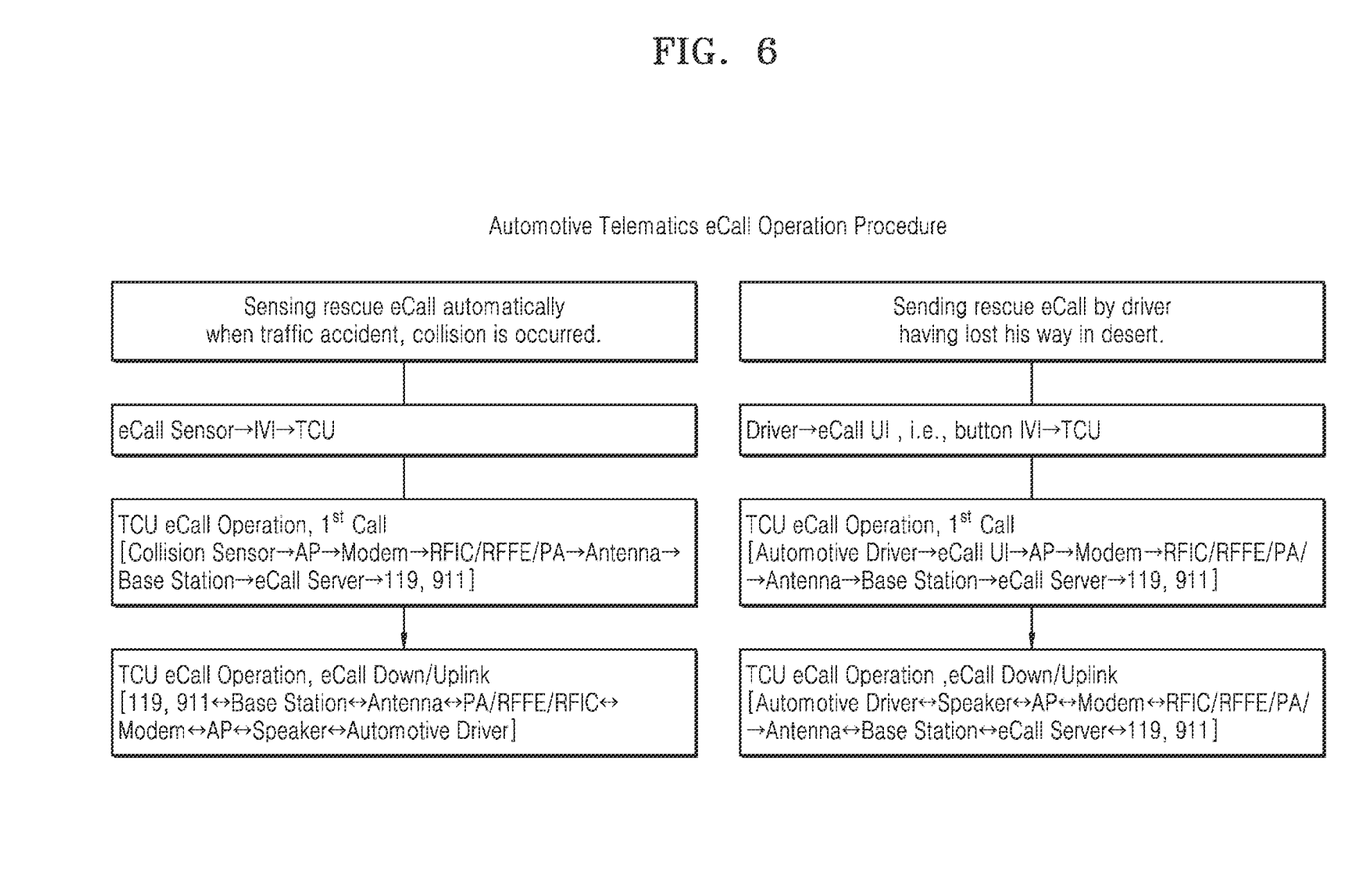
FIG. 6 is a conceptual diagram further illustrating the performance of an eCall in a vehicle according to embodiments of the inventive concept.

FIG. 6 is a conceptual diagram illustrating in one example the execution of an eCall function by a vehicle according to embodiments of the inventive concept.

As previously described, the eCall may occur manually in response to a user actuation (or input) or automatically in response to data collected by a sensor associated with the vehicle or a determination made by a controller in the electronic device in relation to various sensor derived data or inputs.

For example, an electronic device may determine the seriousness of an accident and automatically generate and communicate an vehicle accident notification indicating the seriousness of the accident. As noted above, the generation and communication of the vehicle accident notification may involve the use of various sensors, a GPS apparatus/system, various communication system components, etc. In some embodiments, the electronic device may notify an emergency rescue center (e.g., a 911 call center) using a telematics control unit (TCU). The electronic device may automatically determine that an accident has occurred based on various data collected by sensors even if the driver and/or passenger(s) are unconscious. Alternately, the electronic device may perform an eCall function upon receipt of an input (e.g., a 911 call or button actuation) from a user (e.g., a driver, passenger or passer-by).

Two comparative examples are illustrated in FIG. 6 related to Automotive Telematics eCall Operations Procedures. The first example (left hand column) assumes the automatic performing of an eCall function upon sensor determination of an accident (e.g., a collision). The second example (right hand column) assumes a manual performing of an eCall function in response to user input (e.g., a driver lost in the desert.

Figure 7:
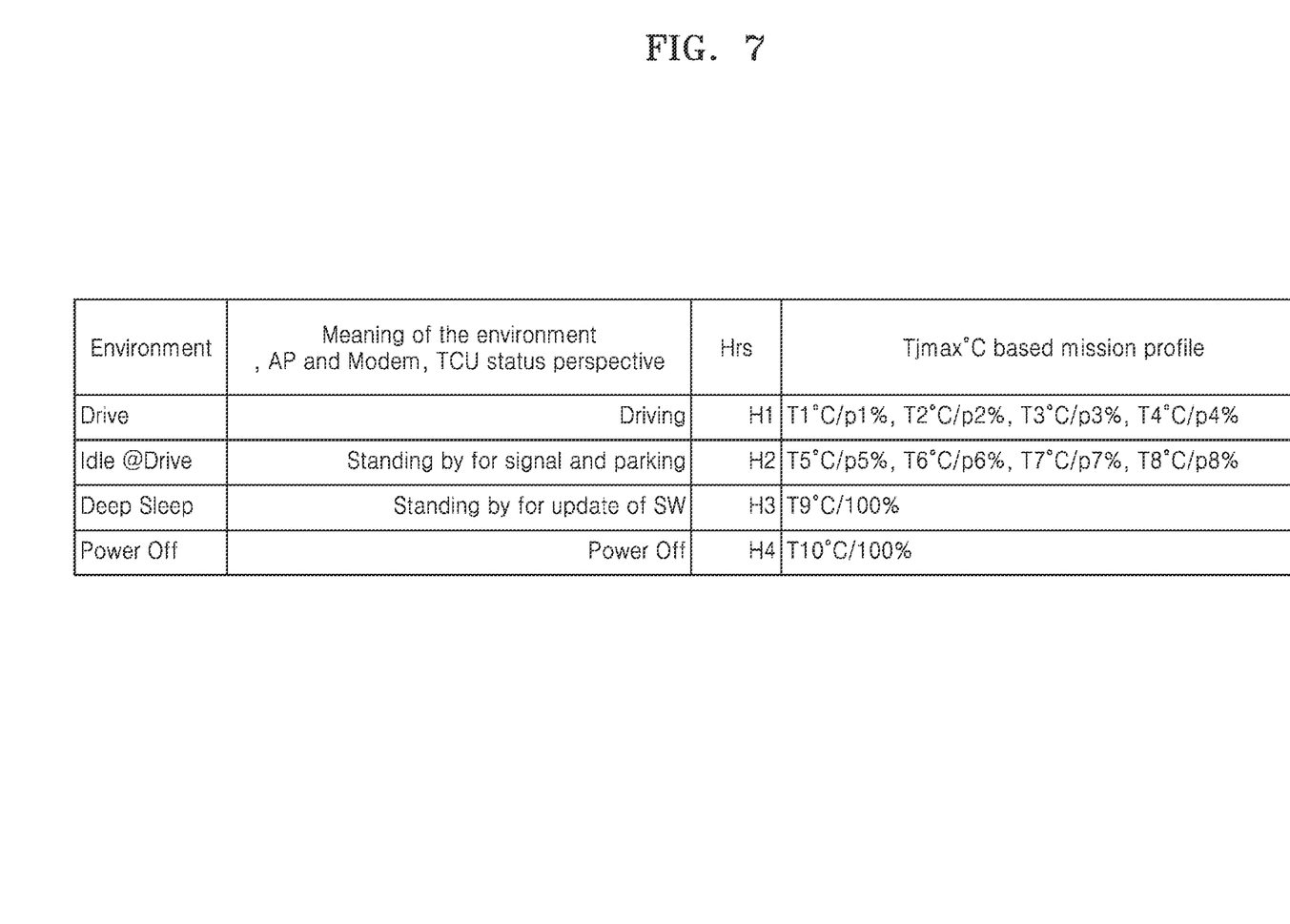
FIG. 7 is a table listing conditions associated with a lifespan test for an electronic device according to embodiments of the inventive concept.

FIG. 7 is a table listing exemplary conditions associated with a lifespan test for an electronic device according to embodiments of the inventive concept.

For an integrated circuit of an electronic device, a guaranteed highest operating temperature, maximum operating voltage, and an expected lifespan may be determined in relation to a high temperature operating life (HTOL) evaluation considering an operating environment temperature as well as an operating time. To ensure (or guarantee) an operating time in relation to an expected operating stability, the electronic device may monitor and control the integrated circuit in such a manner, so as not to exceed a guaranteed temperature upper limit.

Accordingly, when the integrated circuit reaches a reference temperature, such as a guaranteed temperature upper limit, according to the elapse of an operating time in general (or normal) operating scenarios (e.g., a cellular call or data communication) in a vehicle telematics system, performance of the electronic device (or the integrated circuit within the electronic device) may be managed to reduce or minimize performance or the overall operation of the electronic device (or integrated circuit) may be rebooted.

An eCall function performed by the vehicle telematics system in accordance with embodiments of the inventive concept should operate for a certain minimum period of time across a defined range environment conditions. Accordingly, certain telematics operating scenarios (e.g., the eCall scenario) may be defined in relation to different environmental conditions (e.g., an elevated operating temperature, an extended operating period, harsher environmental conditions, etc.).

However, it should also be noted that the integrated circuits included in contemporary and emerging vehicles must stably operate over a defined warranty period (e.g., 15 years), the warranty period is defined in terms of normal operating conditions and related operating scenarios. That is, the warranty period may be determined in relation to an operating temperature range and/or an operating voltage range. Testing associated with the warranty period may be verified via an HTOL evaluation of applying (e.g.) a highest operating voltage and a highest operating temperature for an integrated circuit in the vehicle.

Referring to FIG. 7, the environmental condition associated with an HTOL evaluation (excluding an eCall scenario) may include driving status, signal standby or parking standby status, software update standby status, and power-off status. Here, it is assumed that a guaranteed temperature upper limit (Tjmax—measured in ° C.) is 105° C. For example, a guaranteed time H1 for the driving status may be 10,000 hours, and a test section may include p1% of a test section where a temperature is T1, p2% of a test section where a temperature is T2, p3% of a test section where a temperature is T3, and p4% of a test section where a temperature is T4. A guaranteed time H2 for the signal standby or parking standby status may be 30,000 hours, and a test section may include p5% of a test section where a temperature is T5, p6% of a test section where a temperature is T6, p7% of a test section where a temperature is T7, and p8% of a test section where a temperature is T8. A guaranteed time H3 for the software update standby status may be 70,000 hours, and a test section may include a test section where a temperature is T9. A guaranteed time H4 for the power-off status may be 30,000 hours, and a test section may include a test section where a temperature is T10.

In contrast, the environmental conditions associated with the HTOL evaluation for the eCall function may assume a guaranteed temperature upper limit Tjmax of 125° C.—notably greater than the "normal" guaranteed temperature upper limit of 105° C., and a guaranteed time may be 1 hour—notably less than the "normal" guaranteed time of 10,000 hours.

In this regard, however, those skilled in the art will appreciate that embodiments of the inventive concept are not limited to only the foregoing, exemplary environmental conditions and operating periods associated with the HTOL evaluation Referring to FIGS. 5 and 7, a lifespan test for an electronic device may apply different lifespan test conditions in relation to a first operating mode (e.g., a normal mode) and a second operating mode (e.g., an emergency control mode). Thus, during lifespan testing of the electronic device, lifespan testing in relation to the second operating mode may be performed after lifespan testing in relation to the first operating mode, or vice verses.

Figure 8:
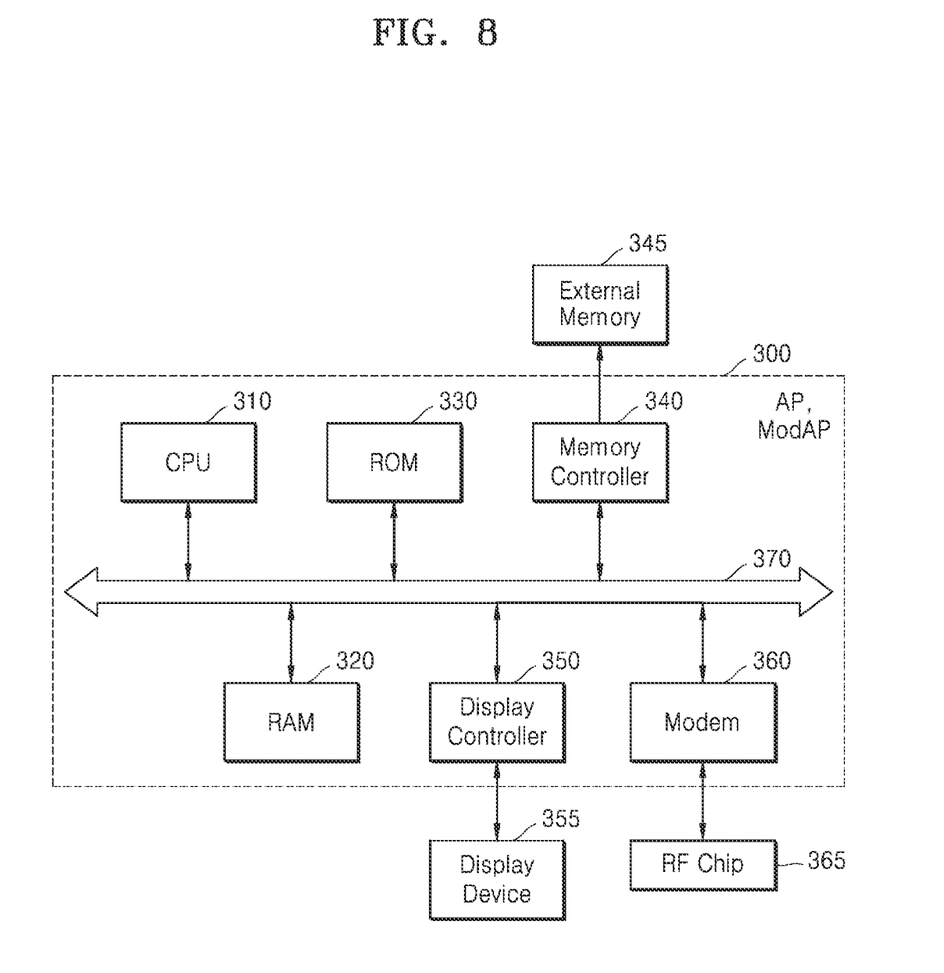
FIG. 8 is a block diagram illustrating an application processor configured to function as a modem according to embodiments of the inventive concept.

FIG. 8 is a block diagram illustrating an application processor 300 in which functions performed by a modem 360 are integrated according to embodiments of the inventive concept.

The application processor 300 may be used to perform telematics function(s) and may therefore be referred to as a ModAP in view of the relevant modem functions.

Referring to FIG. 8, the application processor 300 may be implemented as a system-on-chip (SoC), and include a central processing unit (CPU) 310, a random-access memory (RAM) 320, a read-only memory (ROM) 330, a memory controller 340, a display controller 350, and the modem 360.

The CPU 310 may process or execute programming and/or data storage in the ROM 330 and/or RAM 320. That is, the CPU 310 may control functions of the modem 360 by executing programs stored in the ROM 330 and/or RAM 320. The ROM 330 may store programs and/or data in a non-volatile manner, and may be implemented as erasable programmable ROM (EPROM) or electrically erasable programmable ROM (EEPROM). Also, the RAM 320 may be implemented as a memory, such as dynamic RAM (DRAM) or static RAM (SRAM).

The memory controller 340 may access an external memory 345, and record or read data by controlling the external memory 345 according to a data access request. Also, the display controller 350 may provide image data to a display device 355, and control image display of the display device 355.

The modem 360 may communicate data to an external radio frequency (RF) chip 365, and receive reception data from the RF chip 365.

In some embodiments, the foregoing configuration of FIG. 8 (e.g., the ModAP 300, external memory 345, display device 355 and RF chip 365) may be variously implemented using components of a communication system. Here, the communication system may correspond to one or more terminals and may further include the ModeAP 300 and related components.

Figure 9:
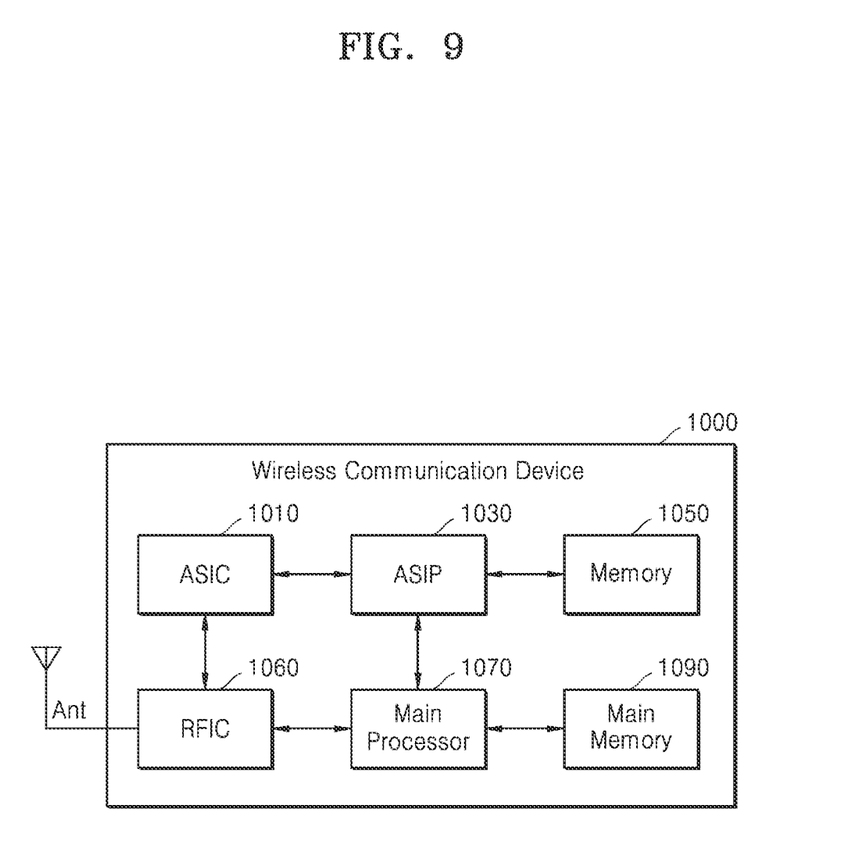
FIG. 9 is a block diagram illustrating a wireless communication device according to embodiments of the inventive concept.

FIG. 9 is a block diagram illustrating a wireless communication device 1000 according to embodiments of the inventive concept.

Referring to FIG. 9, the wireless communication device 1000 may include a modem (not shown) and a radio frequency integrated circuit (RFIC) 1060, and the modem may include an application-specific integrated circuit (ASIC) 1010, an application-specific instruction set processor (ASIP) 1030, a memory 1050, a main processor 1070, and a main memory 1090. The wireless communication device 1000 of FIG. 9 may be a vehicle telematics device or user terminal, according to an embodiment of the inventive concept.

The RFIC 1060 may be connected to an antenna Ant and communicate a signal to or from the outside by using a wireless communication network. The RFIC 1060 may include reception circuits or a transceiver. The RFIC 1060 may exchange carrier wave signals with the modem. According to an embodiment of the inventive concept, the RFIC 1060 may receive an RF signal using a carrier aggregation (CA) via the antenna Ant, and extract component carrier signals.

The ASIP 1030 is an electronic device customized for a specific purpose, and may support a dedicated instruction set for a specific application and execute an instruction included in the instruction set. The memory 1050 may communicate with the ASIP 1030 and store, as a non-transitory storage device, instructions executed by the ASIP 1030. Examples of the memory 1050 may unlimitedly include all types of memories accessible by the ASIP 1030, such as RAM, ROM, a tape, a magnetic disk, an optical disk, a volatile memory, a non-volatile memory, and a combination thereof.

The main processor 1070 may control the wireless communication device 1000 by executing the instructions. For example, the main processor 1070 may control the ASIC 1010 and ASIP 1030, and may process data received via a wireless communication network or process a user input regarding the wireless communication device 1000. The main memory 1090 may communicate with the main processor 1070, and store, as a non-transitory storage device, multiple instructions executed by the main processor 1070. Examples of the main memory 1090 may unlimitedly include all types of memories accessible by the main processor 1070, such as RAM, ROM, a tape, a magnetic disk, an optical disk, a volatile memory, a non-volatile memory, and a combination thereof.

Figure 10:
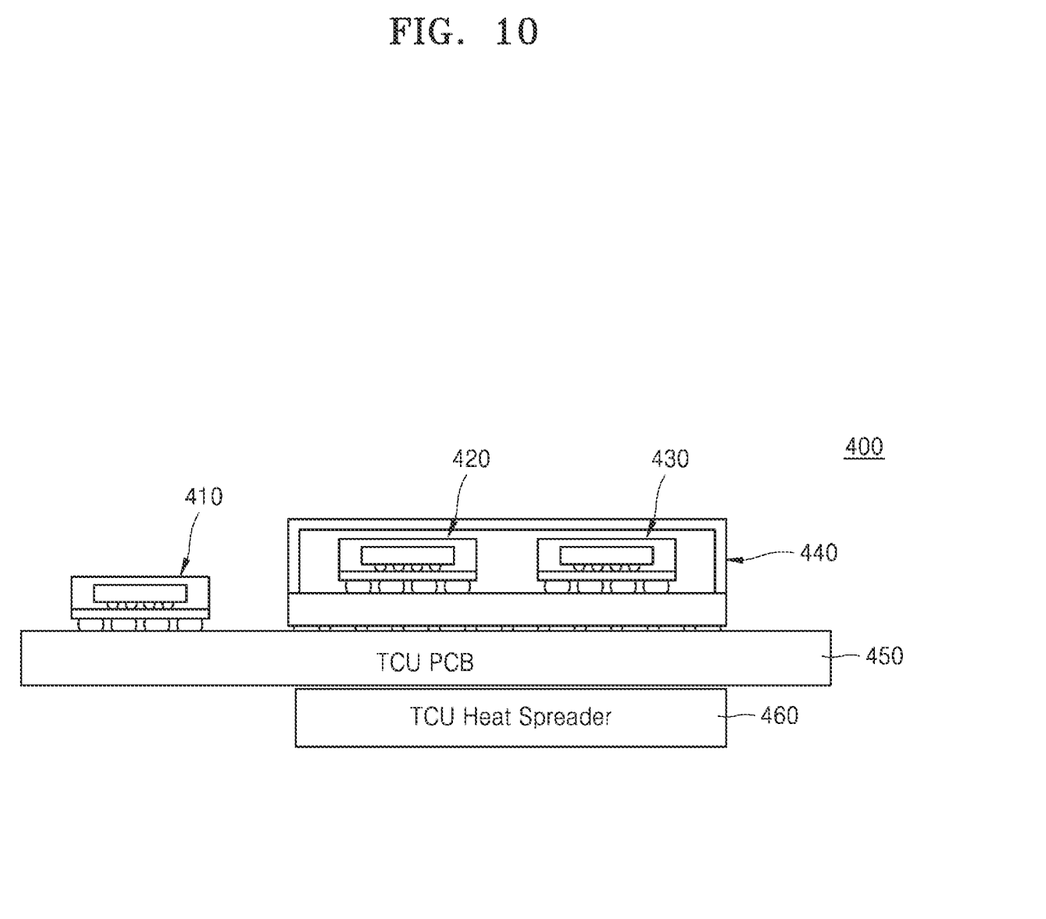
FIG. 10 is a cross-sectional diagram illustrating a heat processing method for an electronic device according to embodiments of the inventive concept.

FIG. 10 is a cross-sectional diagram illustrating a heat processing method for an electronic device 400 according to embodiments of the inventive concept.

The electronic device 400 may include an application processor (AP) package 410, a modem package 420, an RFIC package 430, a metal cover 440, a TCU PCB 450, and a TCU heat spreader 460.

An eCall function associated with a vehicle telematics system must operate over at least a defined period of time across a range of environment conditions. During the eCall scenario, certain integrated circuits (ICs) in the electronic device 400 may operate at a relatively high operating temperature, as compared with a normal operating temperature associated with various normal operating scenarios. Thus, during the eCall scenario, the electronic device 400 may monitor and control the respective operating temperatures as well as operating time period for the AP package 410, modem package 420, and RFIC package 430 included in the electronic device 400.

In some embodiments, a TCU for vehicle telematics may be switched from a structure mounted on a vehicle dashboard to a structure mounted below the vehicle's roof. Further, the TCU may employ hardware in which heat generated during operation of the IC(s) is primarily radiated towards an IC package lower ball.

A network access device (NAD) module may mount, on a PCB, passive devices and IC packages (modem, DRAM, RFIC, power management IC (PMIC), and PM) including main functions required for a call function, in a surface mount device (SMD) manner. For example, the NAD module may include the AP package 410, modem package 420, and RFIC package 430, and may be mounted on the TCU PCB 450 after being manufactured via a process and in structure to be surrounded by the metal cover 440 operating as an electromagnetic interference (EMI) shield. A metal plate is solder-attached to a surface of the TCU PCB 450, which is opposite to a surface of the TCU PCB 450 on which the NAD module is mounted, and thus, a reference ball in IC package may be a main heat radiation path of the NAD module.

Figure 11:
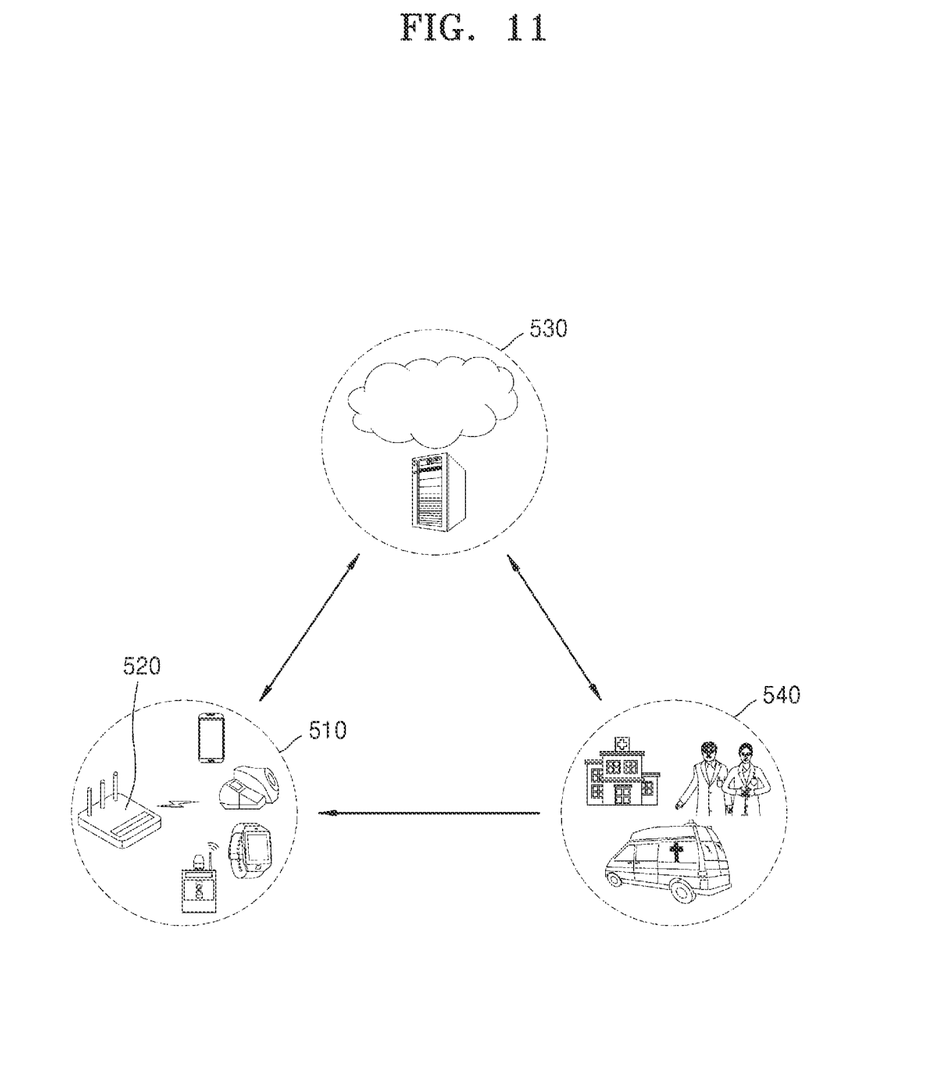
FIG. 11 is a conceptual diagram illustrating a scenario in which an electronic device is applied to a health care device or a fire alarm according to embodiments of the inventive concept.

FIG. 11 is a conceptual diagram illustrating scenarios in which an electronic device according to embodiments of the inventive concept is applied to a health care environment or a fire alarm environment.

Thus, FIG. 11 conceptually illustrates a health care service smart home platform using an electronic device and a related operating method according to embodiments of the inventive concept. Here, the health care service smart home platform may include a smart home device 510, a smart home control device 520, a cloud hub server 530, and an eCall processor 540.

The smart home device 510 may collectively refer to smart devices that collect various types of information, such as individual environment data, lifestyle data, and health data, and communicate same to the smart home control device 520 to integrally manage same. The smart home device 510 may include an IoT home appliance, a health device including a blood pressure gauge, a medical device, a smart watch, a wearable device, or a fire alarm.

The cloud hub server 530 may receive integrated data from the smart home control device 520 and process the same. The eCall processor 540 may include an emergency rescue agency including a medical institution like a hospital, a police station, or a fire department.

For example, when the smart home device 510 including an eCall system detects occurrence of an emergency, the smart home device 510 may communicate emergency information to the eCall processor 540 via the smart home control device 520 and cloud hub server 530. For example, when a fire occurs, an abnormally high temperature environment may be formed. The smart home device 510 or smart home control device 520 may limit performances of components included in the smart home device 510 or smart home control device 520, or perform rebooting, at a high temperature. However, when the smart home device 510 or smart home control device 520 performs an eCall operation upon detecting the occurrence of the emergency, the smart home device 510 or smart home control device 520 may not limit the performances of components such that the eCall operation is stably performed even in a high temperature environment.

While the inventive concept has been particularly shown and described with reference to embodiments thereof, it will be understood that various changes in form and details may be made therein without departing from the spirit and scope of the following claims.

What is claimed is:

1. An electronic device mounted in a vehicle, the electronic device comprising:
    a temperature sensor configured to measure a temperature associated with a measurement target to generate a measured temperature; and
    a controller configured to operate in a normal operating mode if the measured temperature is less than a first reference temperature, and further configured to operate in a limited control mode if the measured temperature is greater than or equal to the first reference temperature,
    wherein during the normal operating mode, the controller is enabled to perform a performance limiting function, and during the limited control mode, the controller is enabled to perform an emergency call (eCall) function and is disabled to perform the performance limiting function, and
    wherein the controller is configured to terminate execution of the eCall function in response to receiving a request data communication, distinct from an eCall, during the limited control mode.

2. The electronic device of claim 1, wherein the controller is further configured while operating in the limited control mode to reboot in response to the measured temperature being greater than or equal to a second reference temperature higher than the first reference temperature.

3. The electronic device of claim 1, wherein the controller is configured to limit a duration of the limited control mode to performance of a pre-set number of eCall functions.

4. The electronic device of claim 1, wherein the controller is configured to limit a duration of the limited control mode to a first time period.

5. The electronic device of claim 1, wherein the electronic device is configured to perform at least one telematics function during the normal operating mode.

6. The electronic device of claim 1, wherein the performance limiting function comprises reducing an operating frequency of a controller in the electronic device or lowering a level of a supply voltage to the controller.

7. The electronic device of claim 6, wherein the generating and communicating of the assistance request is performed in response to a manual actuation by a user.

8. The electronic device of claim 1, wherein the generating and communicating of the assistance request is automatically performed in response to data collected by at least one sensor associated with the vehicle.

9. The electronic device of claim 1, further comprising:
    an eCall module configured to generate an assistance request in response to sensor data received from a sensor associated with the vehicle; and
    a communication module configured to communicate the assistance request under the control of the eCall module and the controller.

10. The electronic device of claim 9, wherein the measurement target is one of the controller, the eCall module, or the communication module.

11. The electronic device of claim 1, wherein the measurement target is an integrated circuit associated with the vehicle.

12. An operating method for an electronic device supporting a vehicle telematics function, the operating method comprising:
    determining whether the electronic device is operating in an emergency control mode;
    upon determining that the electronic device is operating in the emergency control mode, performing an emergency call (eCall) function during a defined period, wherein during the emergency control mode the electronic device is disabled from performing a performance limiting function;
    terminating execution of the eCall function in response to receiving a request data communication, distinct from an eCall, during the emergency control mode; and
    upon determining that the electronic device is not operating in the emergency control mode, operating in a normal mode,
    wherein during the normal mode the electronic device is enabled to perform the performance limiting function.

13. The operating method of claim 12, further comprising:
    while operating in the normal mode,
        measuring a temperature of an integrated circuit to generate a measured temperature and determining whether the measured temperature is greater than or equal to a reference temperature; and
        in response to the measured temperature being greater than or equal to the reference temperature, performing the performance limiting function.

14. The operating method of claim 13, wherein performing the performance limiting function comprises reducing an operating frequency of a controller in the electronic device, or lowering a level of a supply voltage to the controller.

15. The operating method of claim 12, comprising limiting a duration of the defined period to a pre-set number of eCall functions.

16. The operating method of claim 12, comprising performing at least one telematics function is performed during the normal mode.

17. The operating method of claim 12, wherein performing the eCall function includes generating and communicating an assistance request including at least one of accident location information, seriousness assessment information, or damage information.

18. A lifespan testing method for an electronic device supporting a vehicle telematics function, wherein the electronic device is configured to operate in a limited control mode during a normal mode and to perform a performance limiting function when a temperature of an integrated circuit associated with the electronic device is greater than or equal to a reference temperature, and further configured to operate in an emergency control mode in which the performance limiting function is disabled and an emergency call (eCall) function is enabled,
    the testing method comprising:
    performing a lifespan guarantee test by applying first test conditions associated with the emergency control mode, and applying second test conditions associated with the normal mode,
    wherein the first test conditions include a first temperature and a first test time, and
    the second test conditions include a second temperature greater than the first temperature and a second test time less than the first test time.

19. The lifespan testing method of claim 18, wherein the lifespan guarantee test applies the second test conditions after applying the first test conditions.

20. The lifespan testing method of claim 18, wherein the normal mode supports the vehicle telematics function.

\* \* \* \* \*